Figure 1:
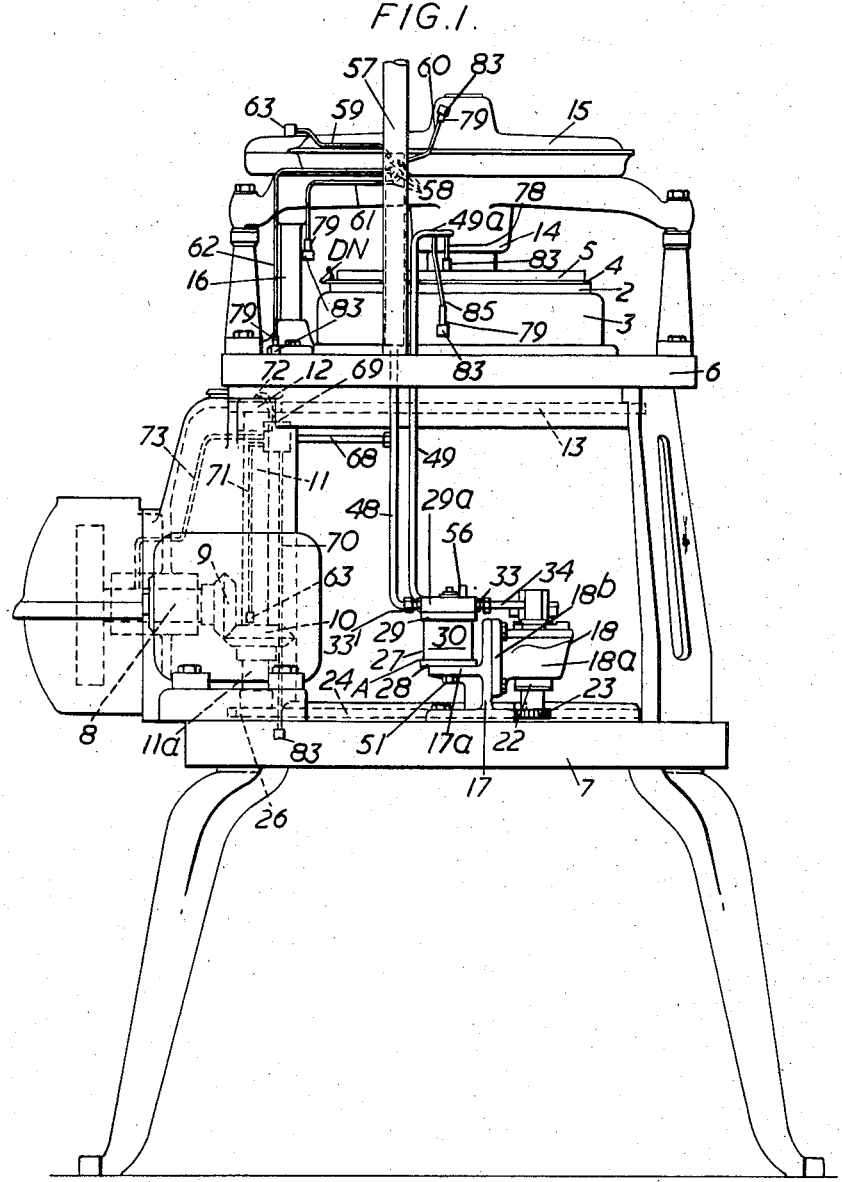

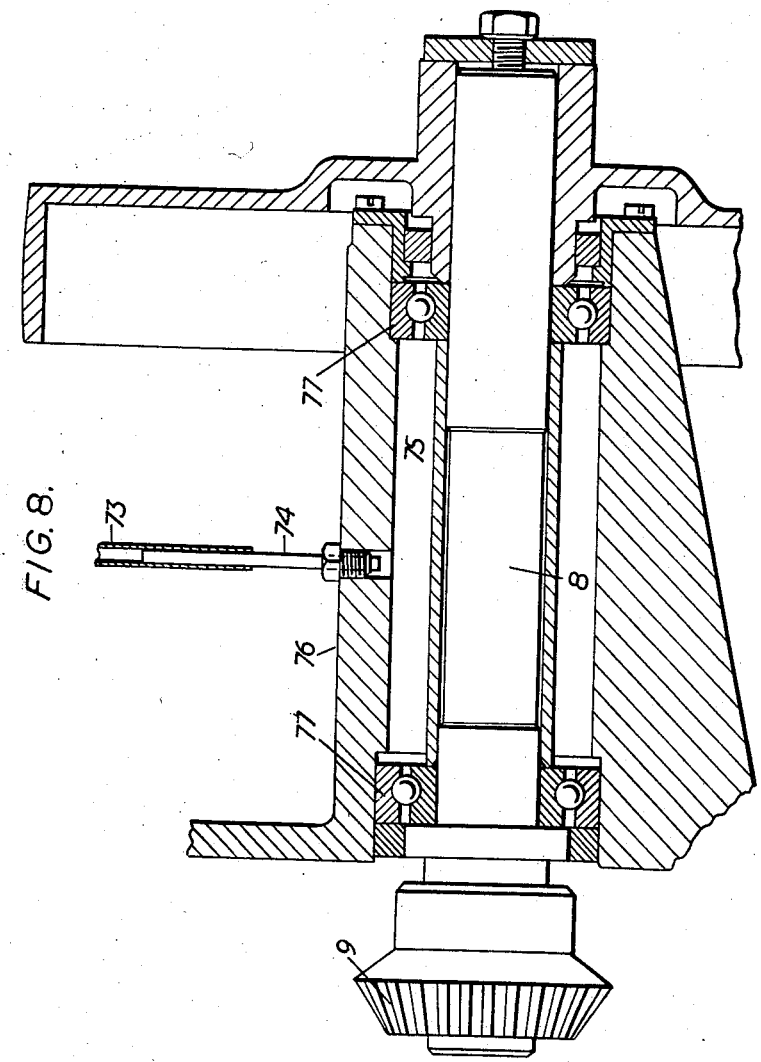

United States Patent Office 2,882,705
Patented Apr. 21, 1959

2,882,705

AUTOMATIC LUBRICATING ARRANGEMENTS FOR MACHINES AND MECHANISMS

Arthur Shortland, Leicester, England

Application April 16, 1956, Serial No. 578,517

Claims priority, application Great Britain April 14, 1955

6 Claims. (Cl. 66—19)

This invention relates to lubricating arrangements for machines and mechanisms, and has reference especially to means adapted to operate automatically for supplying liquid lubricant to machines and mechanisms while they are working, thereby obviating the necessity for the close attention of an operator in respect of periodic oiling and so eliminating the human element except in so far as replenishment of lubricant is required from time to time.

Although of general application and suitable for oiling gears, bearings, ball races, and various rotary components, the automatic lubricating means of this invention are designed for use primarily in knitting machines wherein adequate but not superfluous lubrication is essential not only in the drive-transmitting means but especially within cam systems or/and between the latter and the beds of knitting instruments such as needles, sinkers or web holders, jacks, sliders and the like which work in tricks or grooves in the beds. In this regard an automatic lubricating mechanism is advantageously applicable to knitting machines of the circular type for supplying lubricating oil to relatively large components, parts or surfaces between which there is relative rotation.

The object of the invention is to provide a generally improved automatic lubricating system whereby liquid lubricant from a supply or supplies is transmitted to remote points of a machine or mechanism in a controlled and particularly efficient manner.

A further object is to provide such a lubricating system which is adapted to function only at such times as the machine or mechanism is working and to stop functioning automatically whenever the machine or mechanism stops, thereby avoiding over-lubrication.

The lubricating system constituting this invention comprises at least one container for a supply of liquid lubricant, means for effecting atomization of this lubricant and reducing it to a vapour, i.e. an aeriform or diffused condition in which fine particles of the lubricant are suspended in air, pipes, or conduits for the transmission of such vapour to required points of a machine or mechanism, and provision at these points for securing condensation of the transmitted vapour.

Although there is no limitation in this respect, as will hereinafter appear, the result of the condensation may be to produce drops of the lubricant which are allowed to drip either directly onto a part to be lubricated or onto a surface providing access to the said part.

By the adoption of this invention, therefore, liquid lubricant is first converted into a form in which it can be most easily controlled and conveyed to the points to be lubricated, whereupon it is condensed to its original condition and accurately dispensed in controlled amounts at the precise locations where it will be most effective.

The lubricant employed will usually consist of a relatively thin true lubricating oil of a kind appropriate for oiling the particular machinery concerned. Thus, for the sake of convenience in the following further description and in the appended claims, the liquid lubricant will be referred to simply as "oil," this term being, however, used in a generic sense.

The end of a pipe or conduit for transmitting atomized oil from the supply source to the point where it is dispensed may conveniently be fitted with a plug, pad or the like of felt, soft wood or any other appropriate absorbent material adapted to collect and condense oil particles and to permit condensed oil to seep therethrough and drip therefrom.

Oil dispensed in this manner may drip directly onto a part to be oiled or/and may be received into a recess or depression from which the oil can gradually seep through a hole or holes into bearings or other components. For example, oil may be fed in this way through hollow shafts into bearings.

However, in cases where a part to be oiled or the access to such part, is confined in a closed chamber or other space, atomized oil may alternatively be discharged directly into this chamber or space from an open end of a transmitting pipe or conduit, in which instance the vapour is condensed on the enclosing walls of the chamber or space without contaminating the external atmosphere.

One and the same lubricating system may, of course, rely on a combination of both methods of dispensing the oil from the ends of the pipe or conduits remote from the supply or supplies of oil.

The means for effecting atomization of oil and reducing it to a vapour may advantageously include at least one tube which is suitably arranged within a reservoir for containing oil in bulk and is formed with a small slot or hole disposed in the path of a stream of air under pressure passing through the reservoir. In such an arrangement, an open end of the or each tube is immersed in the contained oil, and the compressed air admitted into the reservoir acts on the surface of the oil thereby forcing oil along the tube and out through the small slot or hole therein where it is entrained in the air stream and diffused into an atomized condition, the vapour formed being conveyed away from the reservoir via transmitting pipes or conduits. An adjustable needle or equivalent valve mounted in the or each tube may be provided to regulate the issuance of oil through the slot or hole.

The air under pressure admitted into the reservoir may be derived from a compressor, e.g. of the vane type, which is adapted to be driven at the desired speed from any convenient source of power.

The improved system may include a plurality of atomizers which derive air under pressure from a common compressor, this arrangement enabling different oils to be contained in the separate reservoirs for use for respectively different purposes, e.g. heavier oils for lubricating gears and bearings and lighter oils for cam systems and beds of knitting instruments.

Figure 2:
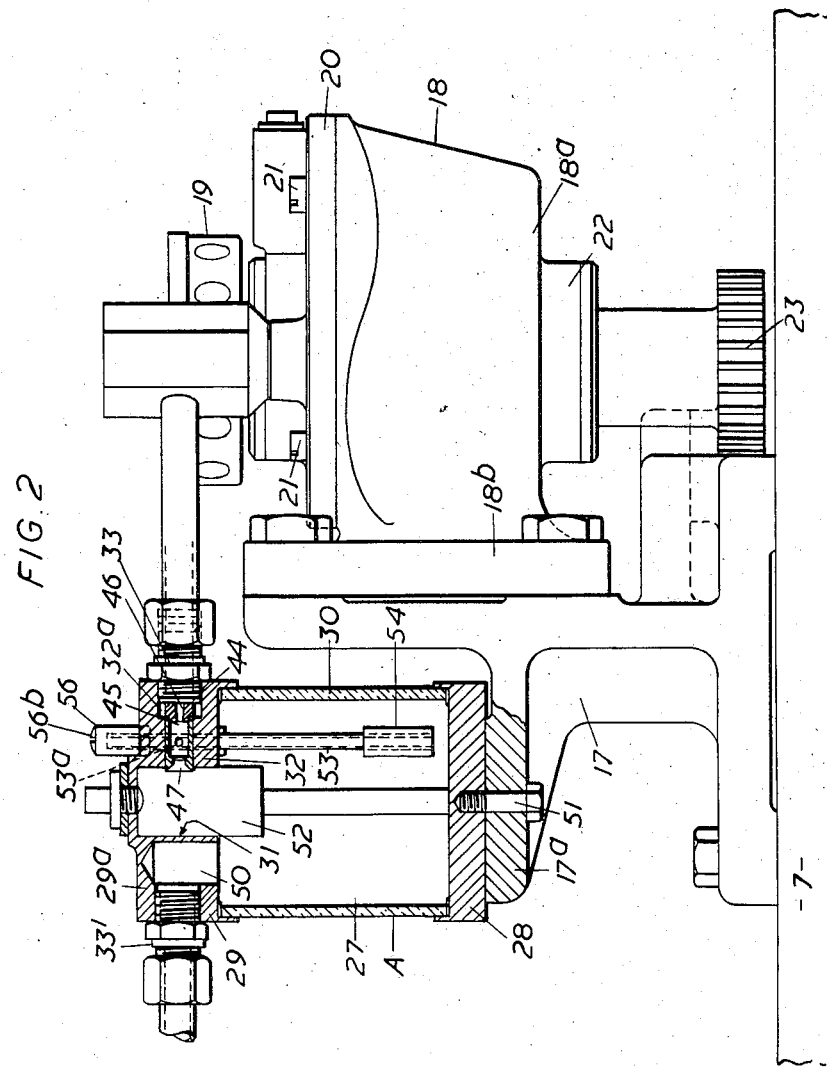
Figure 3:
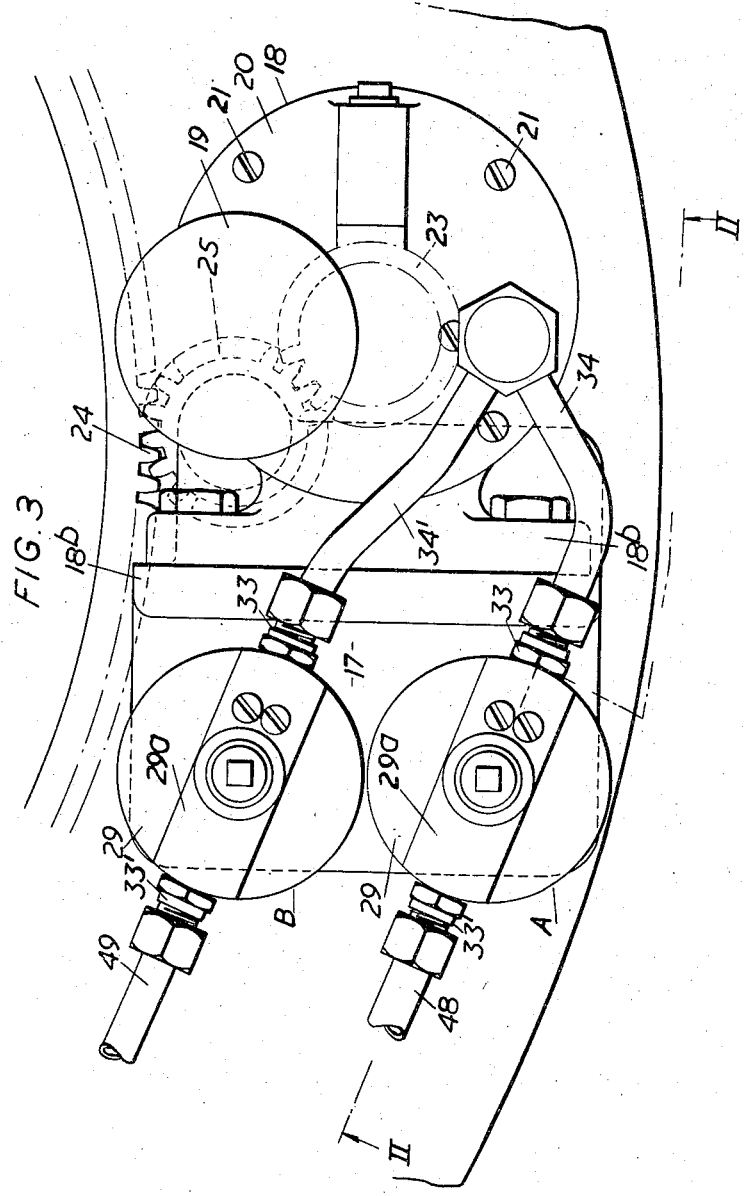
Figure 4:
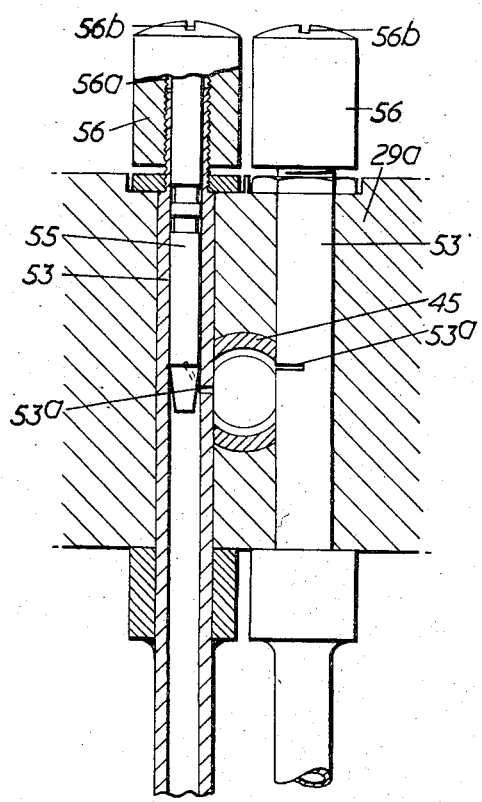
Figure 5:
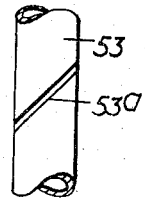
Figure 6:
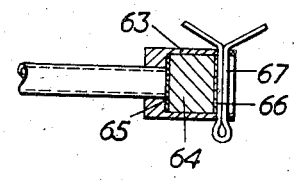
Figure 7:
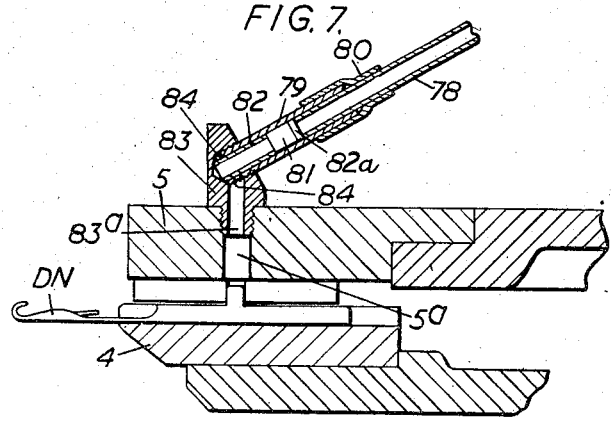

In order that the invention may be more clearly understood and readily carried into practical effect, a specific constructional form of the improved lubricating system as applied to a circular knitting machine of the rotary cylinder and dial type will now be described with reference to the accompanying drawings, wherein, Figure 1 is an elevational view of so much of the said machine as is necessary to illustrate, in diagrammatic fashion, a general arrangement of the lubricating system, Figure 2 is a part-sectional elevation, taken on the line 11—11 of Figure 3, of one of the combined oil reservoirs and atomizers and the associated air compressor, Figure 3 is a detail plan view showing the two combined oil reservoirs and atomizers incorporated in the system and the common compressor from which these atomizers derive air under pressure, Figure 4 is a detail view, partly in section, of the two jet tubes and associated adjustable needle valves included in each of the atomizers, Figure 5 is a fragmentary detail view of one of the jet tubes showing the obliquely disposed slot which is formed therein for the purpose hereinafter to be described, Figure 6 is a detail sectional view depicting a plug of felt fitted on the end of a pipe for the transmission of atomized oil, Figure 7 is a detail sectional view of a portion of the dial and dial cam plate of the machine illustrating the manner in which these components, the dial cam system and the dial needles are lubricated, and Figure 8 is a detail cross-sectional view showing how the main shaft bearings are oiled by direct discharge of atomized oil into the shaft housing.

Like parts are designated by similar reference characters throughout the drawings.

In Figure 1, the rotary needle cylinder of the machine is indicated at 2, the stationary cylinder cam box at 3, the rotary dial at 4 and the superposed stationary dial cam plate at 5. The conventional top plate of the machine whereby the knitting head is supported, is shown at 6 and the bottom plate at 7. The cylinder 2 is driven in the usual way from a main shaft 8 through the medium of intermeshing bevel gears 9 and 10, a vertical drive shaft 11, a spur pinion 12 secured to this shaft and a cylinder driving gear 13 which is arranged to mesh with the said pinion and is rotatable together with the cylinder. Accordingly, a portion of the rotary cylinder component is arranged to revolve within the top plate 6. The dial 4 is carried by a centre shaft which is located in a housing 14 and is adapted to be driven from the cylinder driving gear 13 through the medium of suitable gearing including a top gear housed in a casing 15, and also a vertical side shaft located in a hollow upright column 16. At the lower end of the side shaft is a pinion meshing with the gear 13 whilst another pinion secured upon the upper end of this shaft is arranged in mesh with the top gear in the casing 15.

The lubricating system of this machine comprises two combined oil reservoirs and atomizers indicated generally by the letters A and B (see Figure 3), these two units being supported upon a common bracket 17 bolted upon the top of the bottom plate 7. A rotary compressor from which the atomizers derive air under pressure is shown at 18 in Figures 1, 2 and 3. As will be seen, the compressor casing 18a is flanged at 18b to enable it to be bolted to the back of the bracket 17. The compressor may conveniently be of the vane type, in which instances the casing 18a has mounted therein an eccentrically located rotor (not shown) furnished with centrifugally influenced and radially slidable vanes. In any event, the compressor is fitted at its intake side with an air filter 19 mounted upon a cover plate 20 which is secured by screws 21 to the initially open top side of the casing 18a. The lower end of the rotor spindle extends through a bearing housing 22 integral with the underside of the compressor casing and has secured thereto a driving pinion 23 arranged to be driven from the bottom gear 24 of the machine through the medium of an intermediate gear or pinion 25 (see Figure 3). The gear 24, serving to drive the fabric winding-down or take-up mechanism (not shown) is driven by a spur pinion 26 secured to the lower end of an extension 11a of the vertical shaft 11. Thus, as will be appreciated, the compressor 18, and hence also the transmission of oil to remote points of the knitting machine as will be hereinafter described, is automatically started up and stopped with the said machine. It is essential that the compressor 18 shall be designed to supply air at a comparatively low pressure so as to minimise the moisture content of the air. A low pressure of anything from, say, approximately three to six or seven pounds per square inch is found to be satisfactory for the purpose in view, although it is to be understood that the expression "comparatively low pressure" includes any appropriate higher pressure at which the moisture content of the air is sufficiently low to minimise rusting of metal parts of the machine.

The oil reservoir 27 of each of the two units A and B comprises, as illustrated in Figure 2, a suitably recessed circular base 28, a similarly recessed circular cap 29 and an interposed transparent cylinder 30, e.g. of glass or a glass-like plastic. In use, the atomizer is disposed with its central axis vertical. Centrally within a diametrically disposed upstanding portion 29a of the cap 29 is formed a circular recess 31. Drilled radially through the diametral portion 29a into the said central recess 31 is a hole 32 the outer end of which is counterbored at 32a and tapped to receive the screw-threaded inner end of a standard union 33 whereby the reservoir 27 is connected to a pipe 34 or 34′ serving to convey compressed air from the output side of the compressor 18 into the top of the reservoir. The said inner end of the union 33 bears, through the medium of an interposed washer 44, against the outer end of a tubular element 45 fitted into the hole 32. The outer end of the tubular element 45 has formed therein an inwardly tapered concentric air inlet aperture 46, whilst the opposite outlet end of the said element is flared in the manner indicated at 47 in Figure 2. The inner end of another pipe 48 or 49, for the transmission of oil vapour or mist from the reservoir 27 to remote points at which oil is to be dispensed, is also connected by a union 33′ with the cap 29 and is arranged to communicate with the interior of the transparent cylinder 30 via a recess 50 formed in the underside of the cap. The circular base 28 of each of the two units A and B is secured upon a horizontal portion 17a of the common bracket 17 by means of a screw bolt 51. The upper end of a cylinder 52 of metal gauze depending from the cap 29 is secured within the central recess 31 therein. Also secured at their upper ends within the cap 29 are two vertical jet tubes 53 (Figure 4) of small diameter which are spaced apart parallel to each other and have their open lower ends projecting nearly to the bottom of the reservoir 27. As depicted in Figure 2, the lower end of each of these jet tubes is surrounded by a piece of gauze 54. With any significant amount of oil within either of the reservoirs 27, therefore, the tubes 53 will project down into it. Those portions of the corresponding tubes 53 adjoining their upper extremities extend through the sides of the tubular air inlet element 45 in such a manner as to be exposed to compressed air passing into the reservoir. The inner side of this particular portion of each of the two jet tubes 53 has formed therein a short slot 53a which is obliquely disposed with respect to the axis of the tube as shown more clearly in Figure 5. The effective size of each inclined slot 53a is variable by means of an adjustable needle valve 55 fitted into the upper end of the corresponding tube. As will be seen in Figure 4, the upper ends of the needle valves 55 are furnished with heads 56 each of which is axially bored and tapped at 56a to enable it to be engaged with a correspondingly screw threaded upper end portion of the corresponding jet tube extending above the cap 29. In the top of each head is provided a diametral screw-driver slot 56b.

Compressed air entering the top of each reservoir 27 exerts downward pressure upon the surface of the contained oil with the result that oil is forced up the jet tubes 53 and out through the slots 53a which, incidentally, are oppositely inclined—one right hand and the other left hand. By virtue of the inclination of the slots 53a, the jets of oil issuing therefrom are caused to swirl into the path of the compressed air by which the oil is entrained and some of it is atomized. The travelling oil and air are brought into violent collision with the opposed wall of the circular recess 31, thereby completing the atomization and enabling any surplus oil which is not broken up into particles to be caught by the gauze cylinder 52 and to drain back into the supply. The oil vapour thus continuously produced within the reservoir 27, i.e. in the space above the level of the contained oil, is thereupon conveyed along the relevant pipe 48 or 49.

The reservoir 27 of the atomizer unit A is intended to contain oil suitable for lubricating gears, shafts and bearings, whereas the reservoir of the unit B is for containing a lighter oil for transmission to the cam systems and needles. From the unit A, the pipe 48 extends vertically upwards (see Figure 1) and extends through the top plate 6 where it communicates with the hollow interior of one of the vertical columns 57 serving to support the bobbin stand and superstructure of the machine (not shown). The interior of the column 57 is sealed and there are formed in the wall of the said column a plurality of small holes 58 each of which opens into a laterally extending branch pipe of substantially smaller diameter than the pipe 48. In the specific example illustrated there are four of these relatively fine pipes, viz. pipes 59, 60, 61 and 62 for the transmission of atomized oil from the supply source A to the top (dial driving) gear in the casing 15, the centre shaft located in the housing 14, the vertical side shaft housed in the column 16 and the top plate 6 respectively. The end of the pipe 59 (and of each of certain other pipes hereinafter to be mentioned) has fitted thereon a socket 63 in which is fitted, as depicted in Figure 6, a plug 64 of felt sandwiched between two gauze washers 65 and 66. The plug and the washers are retained in the socket 63 by means of a split pin 67. As will be appreciated, the socket on the end of the pipe 59 is fitted into a hole formed in the gear casing 15. The felt plug 64 collects and condenses oil particles and, as previously mentioned, permits condensed oil to seep therethrough and drip therefrom. The outer ends of the pipes 60, 61 and 62 remote from the column 57 are fitted with alternative forms of oil condensing and filtering attachments hereinafter to be described. Thus, in these cases oil, in contradistinction to oil vapour, is dispensed in a controlled fashion from the ends of appropriate pipes in the form of drops. The rate of issuance of these drops from the pipes may to some extent be determined by the density of the absorbent plugs 64. Moreover, the actual amount of oil delivered to a remote point from the end of a transmitting pipe such as those already described may be determined by the diameter of the latter or/and the setting of adjustable control valve means associated therewith.

Extending laterally from the vertical pipe 48 is a branch pipe 68 leading into a distributor 69 from which extend a further group of pipes 70, 71, 72 and 73. The end of the pipe 70 leads vertically downwards into the bottom plate 7 for lubricating the revolving fabric take-up or winding-down mechanism. The pipe 71 also extends downwards from the distributor 69 and conveys atomized oil to a socket 63 containing a felt plug 64 disposed to permit condensed oil to drip therefrom onto the bevel gear 10. In this way both of the intermeshing bevel gears 9 and 10 incorporated in the cylinder drive are oiled. The pipe 72 supplies atomized oil to a felt plug 64 from which oil drips on to the pinion 12 and hence also oils the cylinder driving gear 13.

The end of the pipe 73 remote from the distributor 69, however, is fitted, as shown in Figure 8, with a nozzle 74 the open end of which discharges directly into the closed annular space 75 between the main shaft 8 and its housing 76. The oil vapour or mist in this instance condenses on the walls of the housing 76 and the condensed oil lubricates the main shaft bearings 77.

From the unit B, the pipe 49 extends vertically upwards through the top plate 6 to a point above the knitting head of the machine where it is bent laterally at 49a. Branching from the bent portion 49a is a downwardly directed oil mist transmitting pipe 78 the lower end of which, as illustrated in Figure 7, has fitted therein a tubular extension 79. This extension is attached to the pipe 78 by means of a connector 80. Fitted within the said extension is a felt plug 81 interposed between wire gauze spacers and filters 82 and 82a. The lower end of the tubular extension 79 is screw-threaded and screwed into an oiling nipple 83 which is in turn screwed into a tapped hole formed in the top of the dial cam plate 5. Lateral holes 84 in the wall of the tubular extension communicate with the bore 83a of the nipple 83 from which bore oil condensed at, and seeping through, the felt plug 81 drips through a hole 5a in the cam plate 5 for lubricating the dial cam system and the dial needles DN.

A further downwardly extending pipe 85 branching from the bent portion 49a of the pipe 49 is fitted with a similar oil-condensing attachment combined with an oiling nipple 83 discharging into the cylinder cam box 3.

Each of the pipes 60, 61, 62 and 70 is fitted with a tubular extension 79 which contains a felt plug 81 and gauze spacers 82 and 82' and is screwed into an oiling nipple 83. Thus, the nipples 83 associated with the said pipes 60, 61, 62 and 70 are screwed into tapped holes formed in the centre shaft housing, the column 16, the top plate 6 and the bottom plate 7 respectively.

The pipes for transmitting the oil vapour or mist may be of copper or of any appropriate plastic material.

I claim:

1. In a machine, in combination, parts, including a rotating part, requiring to be lubricated, a reservoir for containing oil in bulk, an air compressor arranged to be driven from said rotating part, means whereby compressed air from the compressor is admitted into and permitted to pass through the reservoir, at least one tube which is arranged within the said reservoir and is formed with a small slot disposed in the path of a stream of the said air, an open end of the tube being immersed in the oil and the compressed air admitted into the reservoir acting on the surface of the oil and thereby forcing oil along the tube and out through the small slot where it is entrained in the air stream and diffused into an atomized condition to produce oil vapour, conduits for the transmission of said vapour to the parts to be lubricated, and means in association with the ends of the conduits remote from the oil reservoir for securing condensation of the transmitted vapour, the arrangement being such that the compressor, and hence also the transmission of oil to the said parts of the machine is automatically started up and stopped with the latter.

2. A combination according to claim 1, wherein the air admitted into the reservoir is at a low pressure of the order of from three to seven pounds per square inch so as to minimise the moisture content of the air.

3. In a machine, in combination, parts, including a rotating part, requiring to be lubricated, a reservoir for containing oil in bulk, said reservoir comprising a recessed base, a similarly recessed cap, and a vertically disposed transparent cylinder interposed between the said base and cap, the underside of the cap having formed therein a recess communicating with a hole drilled radially through said cap, an air compressor arranged to be driven from the aforesaid rotating part, a tubular element fitted in the radial hole in the cap, a pipe connecting the compressor with the cap so that compressed air passing through this pipe is conveyed via the tubular element into the top of the reservoir, a tubular portion of metal gauze which depends from the cap and is secured within the recess therein, two jet tubes which are secured within the cap and have open lower ends projecting down into the transparent cylinder, the portions of said jet tubes adjoining their upper extremities extending through the sides of the said tubular element suchwise as to be exposed to compressed air passing into the reservoir, and the said portion of each jet tube having formed therein a short slot which is obliquely disposed with respect to the axis of the tube, the two slots being oppositely inclined and the arrangement being such that the compressed air admitted into the reservoir acts on the surface of the oil thereby forcing oil up the jet tubes and out through the inclined slots where it is entrained in the air stream and diffused into an atomized condition to produce an oil vapour, whereby any surplus oil not broken up into particles is caught by the tubular portion of metal gauze and thereby enabled to drain back into the reservoir, a further pipe connected with the cap for conveyance of oil vapour away from the reservoir, conduits branching from said further pipe for the transmission of the vapour to the parts to be lubricated, and means in association with the ends of the conduits remote from the reservoir for securing condensation of the transmitted vapour, the lubricating arrangement being such that the compressor, and hence also the transmission of oil to the said parts of the machine is automatically started up and stopped with the latter.

4. A combination according to claim 3, wherein the effective size of the inclined slot in each jet tube is variable by means of an adjustable needle valve fitted into said tube.

5. In a circular knitting machine, in combination, at least one grooved rotary needle bed, knitting needles in said beds, a stationary cam system whereby said needles are actuated, a driven main drive shaft, bearings in which said shaft is mounted, gearing for transmitting a drive from the shaft to the rotary needle bed, two reservoirs one containing a heavier and the other a lighter lubricating oil, a single air compressor mounted on and arranged to be driven from the machine, an atomizer associated with each of the two reservoirs and deriving air under pressure from the single compressor common to both, said atomizers reducing the oils in the reservoirs to vapours, conduits for the transmission of the vapour of the heavier oil from one reservoir to the main shaft, main shaft bearings and drive-transmitting gearing, further conduits for the transmission of the vapour of the lighter oil from the other reservoir to the needle bed, the needles and the cam system, and means in association with the ends of the conduits remote from the reservoirs for securing condensation of the transmitted vapours.

6. In a circular knitting machine, in combination, a rotary needle cylinder, plain needles in said cylinder, a rotary needle dial, rib needles in said dial, a stationary cam box incorporating cams actuating said plain needles, a stationary cam plate disposed above the dial and incorporating other cams for actuating the rib needles, a driven main drive shaft, drive-transmitting means including bevel gears, a vertical shaft and spur gearing for rotating the needle cylinder, a centre shaft carrying the needle dial, further gearing for transmitting a drive to said centre shaft from the aforesaid spur gearing, fabric winding-down mechanism, gearing deriving motion from the aforesaid vertical shaft for rotating said mechanism bodily at the same rotational speed as the needle cylinder and dial, two reservoirs one containing a heavier oil and the other a lighter oil, a single air compressor which is mounted on the machine and is adapted to be driven from the gearing serving to drive the fabric winding-down mechanism, an atomizer associated with each of the two reservoirs and deriving air under pressure from the single compressor common to both, said atomizers reducing the oils in the reservoirs to vapours, pipes for the transmission of the vapour of the heavier oil from one reservoir to the main shaft, main shaft bearings, and the gearing for driving the needle cylinder and the needle dial, further pipes for the transmission of the vapour of the lighter oil from the other reservoir to the cylinder, dial needles and cam systems, and means in association with the ends of the pipes remote from the reservoirs for securing condensation of the transmitted vapours.

References Cited in the file of this patent

UNITED STATES PATENTS

| 2,556,007 | Slagle | June 5, 1951 |
| 2,613,067 | Goodyer | Oct. 7, 1952 |
| 2,725,734 | Oberly | Dec. 6, 1955 |
| 2,762,457 | Andersen et al. | Sept. 11, 1956 |